US009861092B2

(12) United States Patent
Purpura

(10) Patent No.: US 9,861,092 B2
(45) Date of Patent: Jan. 9, 2018

(54) BOUNDARY CONTROL DEVICE, BOUNDARY CONTROL SYSTEM, AND METHOD OF CONDITIONING THE BEHAVIOR OF ANIMALS

(71) Applicant: William J. Purpura, Pataskala, OH (US)

(72) Inventor: William J. Purpura, Pataskala, OH (US)

( * ) Notice: Subject to any disclaimer, the term of this patent is extended or adjusted under 35 U.S.C. 154(b) by 0 days.

(21) Appl. No.: 15/213,057

(22) Filed: Jul. 18, 2016

(65) Prior Publication Data

US 2017/0027157 A1 Feb. 2, 2017

Related U.S. Application Data

(60) Provisional application No. 62/282,164, filed on Jul. 28, 2015.

(51) Int. Cl.
| *A01M 29/16* | (2011.01) |
| *G08B 7/06* | (2006.01) |
| *A01K 29/00* | (2006.01) |
| *A01K 15/02* | (2006.01) |
| *A01M 29/10* | (2011.01) |
| *G08B 13/12* | (2006.01) |

(52) U.S. Cl.
CPC ........... *A01M 29/16* (2013.01); *A01K 15/021* (2013.01); *A01K 29/005* (2013.01); *A01M 29/10* (2013.01); *G08B 7/06* (2013.01); *G08B 13/122* (2013.01)

(58) Field of Classification Search
CPC ..... A01M 29/16; A01M 29/10; A01K 15/021; A01K 29/005; A01K 27/009; A01K 15/023; G08B 7/06; G08B 21/0261; G08B 13/122
See application file for complete search history.

(56) References Cited

U.S. PATENT DOCUMENTS

| 5,608,381 | A | * | 3/1997 | McCarney | A01K 15/023 119/719 |
| 5,760,686 | A | * | 6/1998 | Toman | G08B 5/006 340/331 |
| 5,939,987 | A | * | 8/1999 | Cram | G08G 1/095 116/22 A |
| 6,016,100 | A | * | 1/2000 | Boyd | A01K 15/02 119/712 |
| 7,462,364 | B2 | * | 12/2008 | Bell | A01M 29/10 424/405 |
| 8,410,941 | B2 | * | 4/2013 | Kelly | E01B 17/00 116/22 A |
| 2002/0011020 | A1 | * | 1/2002 | Nelson | A01M 1/023 43/107 |

(Continued)

*Primary Examiner* — Nay Tun
(74) *Attorney, Agent, or Firm* — Ice Miller LLP

(57) ABSTRACT

A boundary control device, a boundary control system, and a method of conditioning the behavior of animals are provided. The boundary control device includes a base member configured to be positioned adjacent a boundary, a sound emitter coupled to the base member and configured to emit a sound upon activation, a light emitter coupled to the base member and configured to emit a light upon activation, and a boundary sensor coupled to the base member and configured to sense an object disposed adjacent the boundary. The sound emitter and the light emitter are activated upon sensing of the object by the boundary sensor.

7 Claims, 5 Drawing Sheets

(56) References Cited

U.S. PATENT DOCUMENTS

| | | | | |
|---|---|---|---|---|
| 2002/0145519 A1* | 10/2002 | Hykawy | ................ | G08G 1/164 |
| | | | | 340/567 |
| 2003/0210153 A1* | 11/2003 | Right | ....................... | G08B 3/10 |
| | | | | 340/691.1 |
| 2004/0008581 A1* | 1/2004 | Nadeau | .................. | A01K 79/02 |
| | | | | 367/139 |
| 2011/0012734 A1* | 1/2011 | Reese | .................... | G08B 13/19 |
| | | | | 340/541 |

* cited by examiner

BOUNDARY CONTROL DEVICE, BOUNDARY CONTROL SYSTEM, AND METHOD OF CONDITIONING THE BEHAVIOR OF ANIMALS

RELATED APPLICATION DATA

This application claims priority benefit of U.S. Provisional Application No. 62/282,164 filed Jul. 28, 2015, which is hereby incorporated in its entirety herein by reference.

FIELD OF THE DISCLOSURE

The present disclosure relates to a control device and, more specifically, to a boundary control device.

BACKGROUND OF THE DISCLOSURE

It is often desirable to prevent unwanted or unauthorized wildlife, other animals, or people from crossing a boundary or entering an area. In one non-limiting example, a landowner may wish to prevent deer or other wildlife or unwelcome persons from entering an area, including a sensitive area such as a garden, a food-growing plot, or a field or yard. Fencing is obtrusive and costly, and other boundary control devices or systems, including, alert, deterrent, or notification systems or methods, require a robust power supply that cannot be easily positioned along a large border or at remote locations.

Therefore, there exists a need for a boundary control device, a boundary control system, and a method of conditioning behavior in animals that effectively controls a boundary, including a large or remote boundary, in a non-obtrusive, inexpensive, and energy efficient manner.

SUMMARY OF THE DISCLOSURE

In accordance with an embodiment of the present disclosure, a boundary control device is provided. The boundary control device includes a base member configured to be positioned adjacent a boundary, a sound emitter coupled to the base member and configured to emit a sound upon activation, a light emitter coupled to the base member and configured to emit a light upon activation, and a boundary sensor coupled to the base member and configured to sense an object disposed adjacent the boundary, wherein the sound emitter and the light emitter are activated upon sensing of the object by the boundary sensor.

The boundary control device may further include at least one power storage member to store power for the boundary control device. The boundary control device may further include a power generator configured to supply power to the boundary control device. The sound may include a predatory animal sound. The light may include a high intensity strobing light. The base member may include a post such that the sound emitter, the light emitter, and the boundary sensor may be coupled to the post in a vertically extending array. At least one of the sound emitter, the light emitter, and the boundary sensor may include at least one of a position adjustment member and an angular orientation adjustment member. The boundary control device may further include a rail member suspended from an upper portion of the base member and extending along the base member. The boundary control device may further include a controller in electrical communication with at least one of the sound emitter, the light emitter, and the boundary sensor, wherein the controller may be coupled to the rail member. The controller may include an activation timer configured to control an activation duration.

In accordance with an embodiment of the present disclosure, a boundary control system is provided. The boundary control system includes a first base member positioned adjacent a boundary, a second base member spaced from the first base member and positioned adjacent the boundary, a first sound emitter coupled to the first base member and configured to emit sound toward the boundary, a second sound emitter coupled to the second base member and configured to emit sound toward the boundary, a first light emitter coupled to the first base member and configured to emit light toward the boundary, a second light emitter coupled to the second base member and configured to emit light toward the boundary, and at least one boundary sensor coupled to the first base member and configured to sense an object disposed adjacent the boundary, wherein the first sound emitter, the second sound emitter, the first light emitter, and the second light emitter are activated upon sensing of the object by the boundary sensor.

The boundary control system may further include at least one boundary sensor coupled to the second base member and configured to sense an object disposed adjacent the boundary. The boundary control system may further include a controller having an activation timer configured to control an activation duration of the first sound emitter, the second sound emitter, the first light emitter, and the second light emitter. The first sound emitter and the first light emitter may be configured to emit sound and light toward the second base member. The second sound emitter and the second light emitter may be configured to emit sound and light toward the first base member.

In accordance with an embodiment of the present disclosure, a method of conditioning the behavior of animals is provided. The method includes providing at least one base member adjacent a boundary, sensing the presence of an animal adjacent the boundary, emitting a sound toward the boundary upon sensing the presence of the animal adjacent the boundary, and emitting a light toward the boundary upon sensing the presence of the animal adjacent the boundary.

The method may further include controlling an activation duration for emitting the sound toward the boundary and emitting the light toward the boundary. The method may further include determining a sensing frequency based on the frequency of sensing the presence of an animal adjacent the boundary, wherein controlling an activation duration may include adjusting the activation duration based on the sensing frequency. The method may further include storing power for the sensing, emitting the sound, and emitting the light. The method may further include generating power for the sensing, emitting the sound, and emitting the light.

DETAILED DESCRIPTION

In accordance with the foregoing summary, the following is a detailed description of the embodiments of the disclosure, which are considered to be the best modes thereof. The methods and systems herein described are not intended to be exhaustive or to limit the disclosure to the precise forms disclosed.

Figure 1:
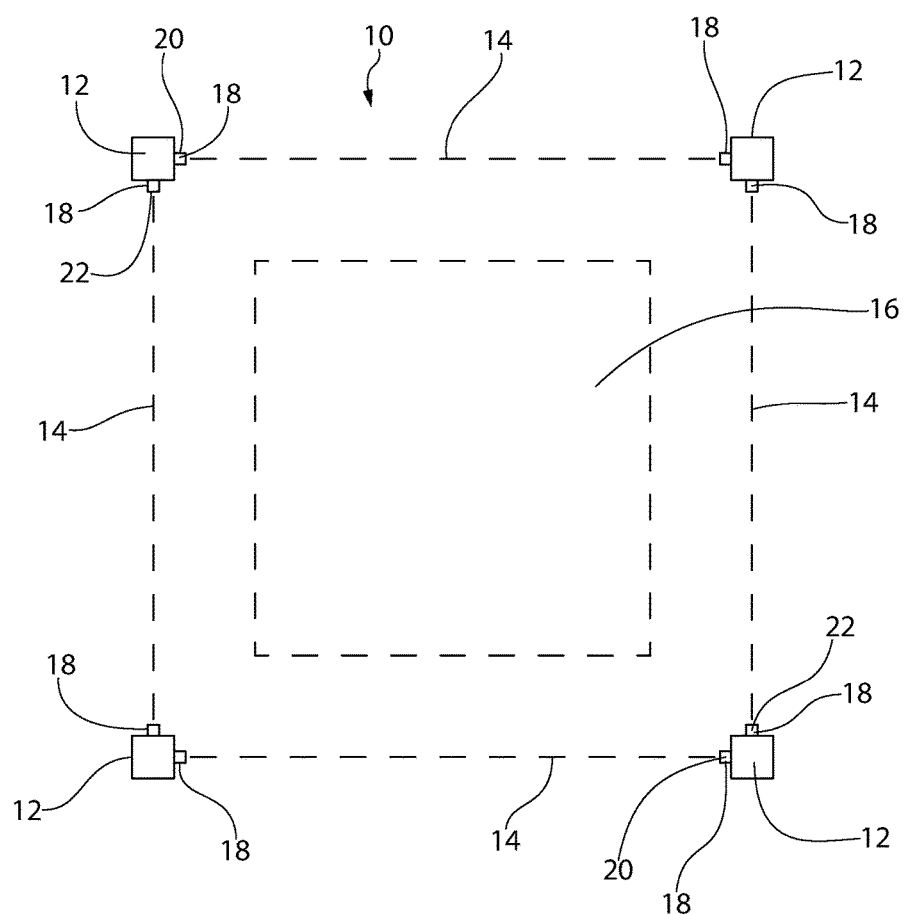
FIG. 1 is a top plan view of a boundary control system in accordance with one embodiment of the present disclosure.

Reference is now made to FIG. 1, which illustrates a boundary control system 10 and multiple boundary control devices 12 in accordance with one embodiment of the present disclosure. The boundary control system 10 of FIG. 1 includes multiple boundary control devices 12 positioned on, along, or adjacent to a boundary 14. The boundary 14 of one embodiment is configured to surround an area 16. The area 16 of one or more embodiments includes a housing structure, including without limitation a home or a business office, an agricultural plot, including without limitation a garden or food plot, or a field or pasture.

Figure 3:
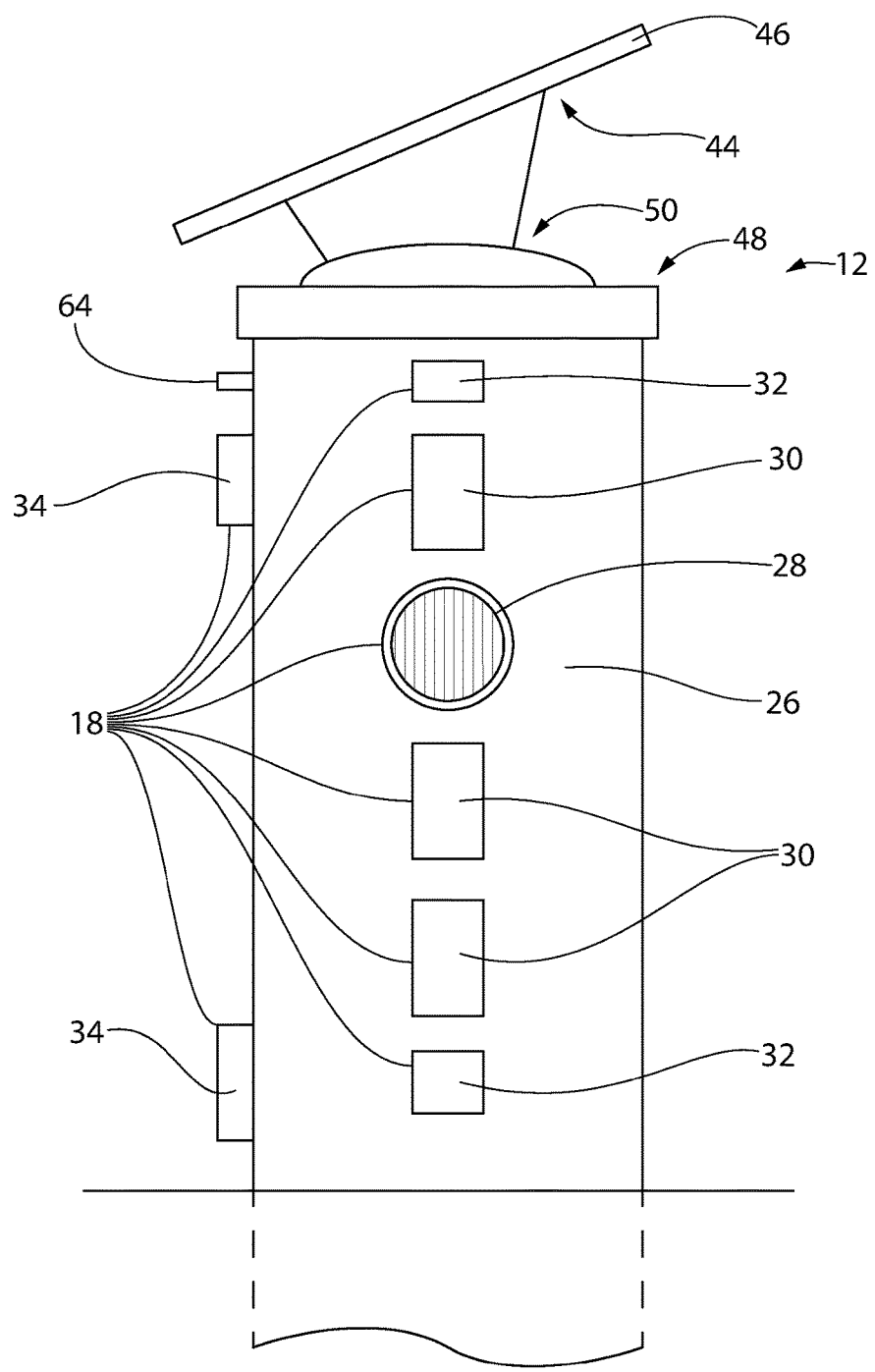
FIG. 3 is a front elevation view of a boundary control device in accordance with one embodiment of the present disclosure.

The boundary 14 of one embodiment is formed by the positioning of the boundary control devices 12, as illustrated in FIG. 1. As will be described in further detail below and as illustrated in FIG. 3, each boundary control device 12 includes components 18 directed toward or along adjacent to the boundary 14. In one or more embodiments of the present disclosure, the boundary control device 12 includes at least two components 18, such as a first sensor portion 20 and a second sensor portion 22, that are arranged at about 90 degrees from each other. In one non-limiting example, the first sensor portion 20 is a boundary sensor, as described in further detail below, and the second sensor portion 22 is a reflector, also described in further detail below and illustrated in the embodiment of FIG. 3. With such embodiments, four boundary control devices 12 may be positioned to form a square-shaped boundary 14, as illustrated in FIG. 1. It will be appreciated that one or more boundary control devices 12 may include components 18 arranged at angles other than 90 degrees from each other such that a boundary 14 having another shape, such as a triangular, hexagonal, octagonal to name a few non-limiting examples. In one non-limiting example not shown, three boundary control devices 12 each include components 18 arranged at about 60 degrees from each other in order to form a triangular boundary 14. One having ordinary skill in the art will recognize the numerous combinations of component arrangements and boundary control device 12 spacing arrangements to create boundaries 14 of different configurations, and such combinations and resulting configurations form part of the present disclosure.

Figure 2:
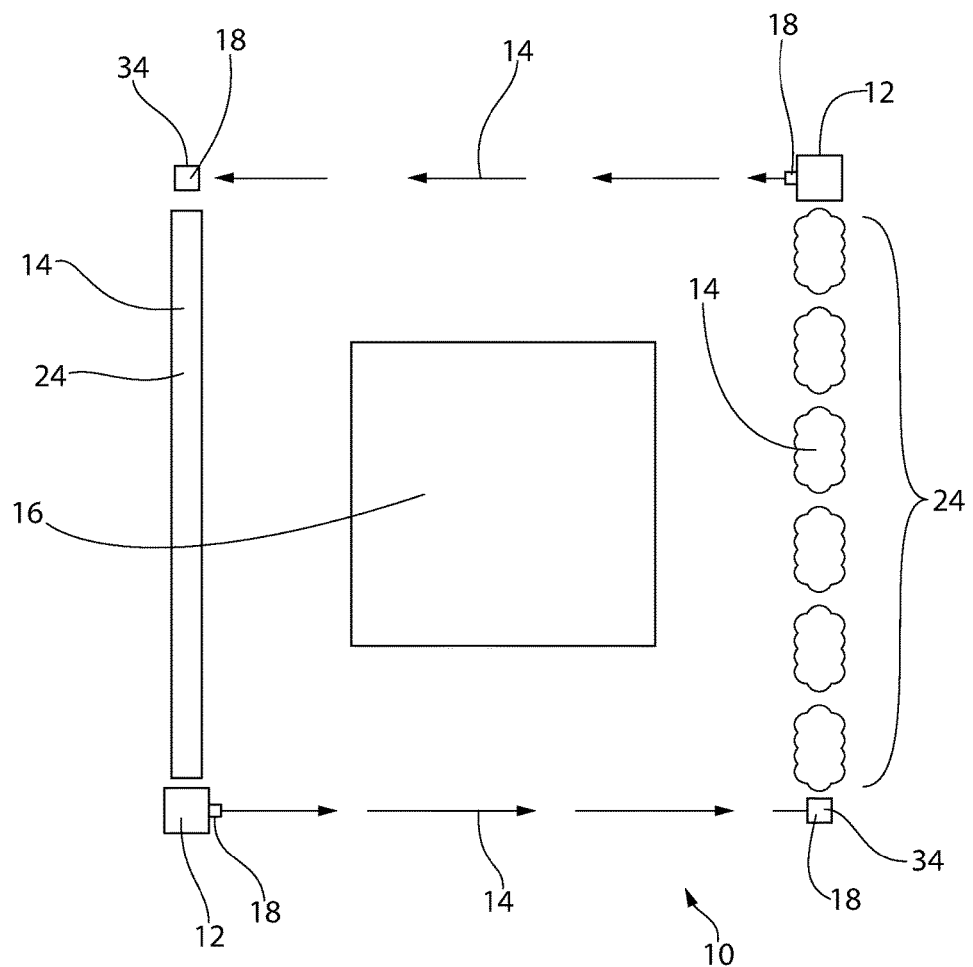
FIG. 2 is a top plan view of a boundary control system in accordance with one embodiment of the present disclosure.

Referring now to FIG. 2, one or more embodiments of the present disclosure include a boundary control system 10 having one or more boundary control devices 12 spaced from each other. As illustrated in FIG. 2, two devices 12 spaced from each other and one or more physical boundaries 24 form the boundary 14. The physical boundaries 24 of one or more embodiments may include a fence, trees, bushes, a body of water, a terrain barrier, such as a cliff or hill, or any other type of physical barrier. Further, the boundaries 24 may be replaced by other boundary control devices, including mechanical, electrical, or natural systems or structures. Each device 12 of the embodiment of FIGS. 1 and 2 includes a component 18, such as the reflector described below, that is spaced from another component 18, such as the boundary sensor described below, of the device 12. In additional embodiments, one or more of the devices 12 does not include a component 18 spaced from another component, such as embodiments featuring a motion detection or optical sensing component that does not require a spaced component, such as a reflector, as described in further detail below.

The embodiments of FIGS. 1 and 2 illustrate the boundary control system 10 or the boundary control device 12 of embodiments that includes or operates on, along, or adjacent to the boundary 14 that forms a substantially enclosed or surrounding area as, around, or outside of the area 16. Although not illustrated in FIGS. 1 and 2, the boundary control system 10 or boundary control device 12 of one or more embodiments includes or operates on, along, or adjacent to a boundary 14 that does not form an enclosed or surrounded area. As one non-limiting example not illustrated herein, the boundary control system 10 or the boundary control device 12 includes or operates on, along, or adjacent to a boundary 14 that forms a line or curve to detect or control objects along the boundary.

Referring now to FIG. 3, the boundary control device 12 of one embodiment includes a base member 26 configured to be positioned adjacent the boundary 14, as illustrated in FIGS. 1 and 2. The base member 26 in one embodiment is a hollow, vertically-extending post and configured to house one or more of the components 18. The components 18 are vertically aligned or form a vertically-extending array in the embodiments illustrated in FIG. 3. The base member 26 in one non-limiting example is a square hollow post made from polyvinyl chloride and measuring 6"×6"×4' with 2' extending into the ground. In additional embodiments, the base member 26 does not extend into the ground, includes a base flange or other structure, includes wheels or other mobility components, and/or includes floats or other buoyant structures in order to position the device 12 on or in water. Additionally, the base member 26 includes an external on/off switch 64 in an embodiment to allow a user to disable the device 12 upon approaching the boundary 14. In additional embodiments, the device 12 is remotely activated, remotely monitored, and/or includes the on/off switch 64 internally.

The components 18 of the embodiment of FIG. 3 includes a sound emitter 28 coupled to the base member 26. The sound emitter 28 is configured to emit a sound upon activation. In one non-limiting example, the sound emitter 28 is a speaker or transducer capable of producing a sound or vibrational signal through the air on, along, or adjacent to the boundary 14. Another component 18 of an embodiment includes a light emitter 30 coupled to the base member 26. The light emitter 30 is configured to emit a light upon activation. In one non-limiting example, the light emitter 30 is a strobe light capable of producing a strobing light on, along, or adjacent to the boundary 14. In the embodiment of FIG. 3, the light emitter 30 is a high intensity strobing light. Each light emitter 30 is a strobing light having a power output of between 1 and 20 watts in one embodiment, between 3 and 10 watts in another embodiment, and between 4 and 6 watts in another embodiment of the present disclosure. Each light emitter 30 is a strobing light having a candela range between 15 and 150 candela in an embodiment, between 30 and 130 candela in an embodiment, and between 50 and 100 candela in an embodiment of the present disclosure. In the illustrated embodiment, three light emitters 30 are included. In additional embodiments, a single light emitter 30 is provided. In additional embodiments, one or more light emitters 30 may be positioned at any location on the device 12 or spaced from the device 12.

Another component 18 of an embodiment includes a boundary sensor 32 coupled to the base member 26. The boundary sensor 32 is configured to sense an object disposed on, along, or adjacent to the boundary 14. In one non-limiting example, the boundary sensor 32 is a near-infrared retro-reflective photoeye sensor. However, the boundary sensor 32 includes a passive infrared sensor, a microwave sensor, a laser motion detector, a radar or sonar motion sensor, an ultrasonic wave sensor, and a tomographic motion detector in one or more additional embodiments. One of ordinary skill in the art will recognize the various types of electronic and mechanical components and methods capable of detecting or sensing an object located in or moving in an area, and such component and methods form part of the present disclosure.

The boundary sensor 32 includes one or more reflectors 34 coupled to the base member 26 in the FIG. 3 embodiment. The reflectors 34, in one embodiment, reflect the beam produced by the boundary sensor 32 on, along, or adjacent to the boundary 14, as understood by those with ordinary skill in the art. The reflectors 34 of additional embodiments, as described above, may be coupled to the base member 26, may be spaced from the base member 26, or may stand alone on, along, or adjacent to the boundary 14. As one non-limiting example, the components 18 spaced from the devices 12 in FIG. 2 may be reflectors 34 cooperating with boundary sensors 32 in the devices 12. In the illustrated embodiments, the reflectors 34 reflect the beam of a boundary sensor 32 coupled to a base member 26 of another device 12 not illustrated in FIG. 3. In additional embodiments, one or more boundary sensors 32 do not use or require the reflector 34, and the reflector 34, therefore, is omitted in such embodiments. For example, in an embodiment, the boundary sensor 32 is directed or focused toward the boundary 14 to sense or detect an object on, along, or adjacent to the boundary 14. FIG. 3 illustrates two boundary sensors 32 on the device 12. However, in additional embodiments, one boundary sensor 32 is utilized on the device 12 or three or more boundary sensors 32 are utilized. In additional embodiments, boundary sensors 32 may be positioned at any location on the device 12 or spaced from the device 12.

Figure 4:
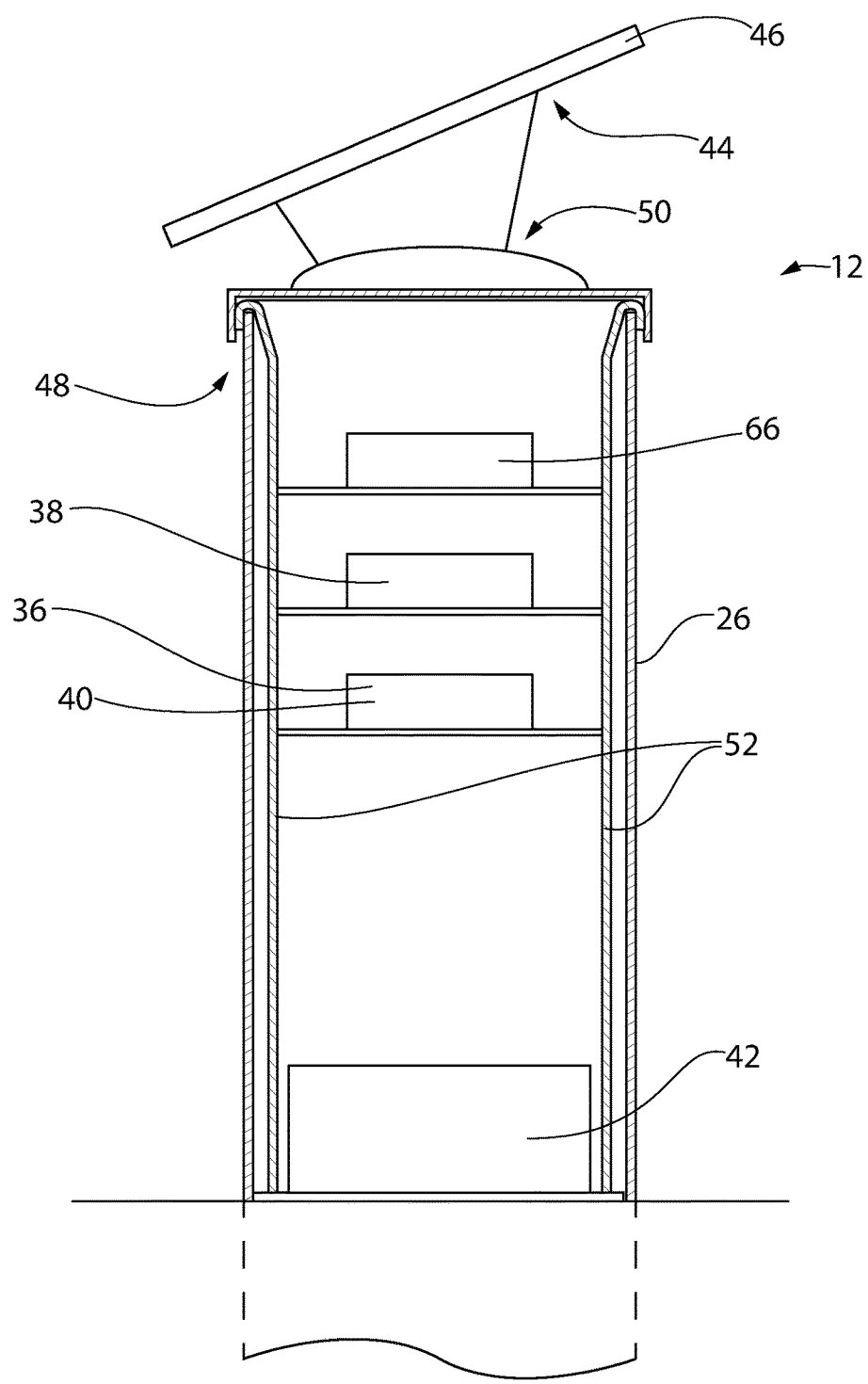
FIG. 4 is a front cross sectional view of boundary control device in accordance with one embodiment of the present disclosure.

Referring now to FIG. 4, with continuing reference to FIG. 3, in the embodiments illustrated, a controller 36 is in electrical communication with one or more components 18, including the boundary sensor 32, the sound emitter 28, and the light emitter 30. In an embodiment, when the boundary sensor 32 senses or detects an object, such as an animal or person on, along, or adjacent to the boundary 14, the controller 36 receives a signal from the boundary sensor 32 indicating the presence of an object on, along, or adjacent to the boundary 14. The controller 36 then activates the sound emitter 28 and the light emitter 30 following the boundary sensor 32 sensing the object. In the illustrated embodiments, the controller 36 simultaneously activates the sound emitter 28 and the light emitter 30 following the boundary sensor 32 sensing the object. In one or more embodiments, the controller 36 activates the sound emitter 28 and the light emitter 30 separately, or at different moments, following the boundary sensor 32 sensing the object, based on one or more commands, input signals, or algorithms of the controller 36.

As illustrated in FIG. 4, the device 12 further includes a rail member 52 suspended from an upper portion 48 of the base member 26 and extending along the base member 26 in one embodiment. In an embodiment, the rail member 52 is contained inside of the base member 26 and houses and/or is coupled to the controller 36 and/or other electronic components or more power components, as described in further detail below. The rail member 52 is configured to be easily lifted up and/or out from the upper portion 48 of the base member 26 in order to increase accessibility and ease of use, adjustment, and maintenance for the one or more electronic components housed in the device 12.

When the controller 36 activates the sound emitter 28, a sound driver 38 is activated to send power to the sound emitter 28. When the controller 36 activates the sound emitter 28, the sound emitter 28 produces a predatory animal sound in one embodiment, such as a barking dog in one non-limiting example. The sound of a predatory animal sound, such as the sound of a barking dog, triggers an evolutionary fear among many animals, including most wildlife, thereby causing the animal to instinctually remove itself from the area adjacent the boundary 14. In another embodiment, when the controller 36 activates the sound emitter 28, the sound emitter 28 produces an alarm or voice alert. Such an embodiment may be employed to control the boundary 14 from animals or persons entering an area.

In one or more embodiments, the controller 36 includes a memory having one or more voice, animal, and/or other sound recordings, such as a digital audio file, stored thereon. Upon activation of the sound emitter 28, the controller 36 activates a selected recording. In an embodiment, a user may select a recording locally or remotely, or the controller 36 selects the recording in accordance with a predetermined algorithm or sequence. In additional embodiments, the controller 36 selects the recording based upon one or more signals received from the boundary sensor 32. In one non-limiting example, the controller 36 selects a voice alert recording sending a verbal warning along or adjacent to the boundary 14 when the boundary sensor 32 detects a person at, along, or adjacent to the boundary 14, and the controller 36 selects a predatory animal, firearm discharge, or other sound recording when the boundary sensor 32 detects an animal at, along, or adjacent to the boundary 14. Although FIG. 3 illustrates a single sound emitter 28, multiple sound emitters 28 may be positioned on or along the device 12, and one or more sound emitters 28 may be positioned at locations remote from the device 12.

When the controller 36 activates the light emitter 30, the light emitter projects a light, such as a strobing light in the illustrated embodiments, on, along, or adjacent to the boundary 14. The projection or activation of the light emitter 30, including sudden flashes of light from a high intensity strobing light, has proven to be especially disturbing to animals, such as deer and other wildlife, that are approaching or positioned adjacent to the boundary 14. The light emitted from the light emitter 30 supplements the sound emitter 28 to provide an alert for boundary control that is markedly superior to the effects of an alert from either a sound alert or a light alert alone. Further, as described in one or more embodiments disclosed herein, the combined effect of activating a predatory animal sound and a strobing light on, along, or adjacent to the boundary 14 results in boundary control that is more effective than the sum of results from a device that activates a predatory animal sound and a device that activates a strobing light.

Upon activation of the light emitter 30 and the sound emitter 28 by the controller 36, an activation timer 40 determines the duration of activation of the sound produced by the sound emitter 28 and the light produced by the light emitter 30. The activation timer 40 in one embodiment includes a manual control member, including an adjustment knob in one non-limiting example, to manually control the duration of the activation. In additional embodiments, the activation timer 40 receives input remotely from a user or external sensor or controller or from the controller 36 in accordance with an algorithm or sequence. In one embodiment, the controller 36 or the activation timer 40 determines a sensing frequency based on the frequency that the boundary sensor 32 senses the presence of an object adjacent the boundary. The controller 36 or activation timer 40 then sets, controls, or adjusts the activation duration based on the sensing frequency.

The device 12 of the embodiment illustrated in FIG. 4 further includes a power storage member 42 to store power, such as for sensing, detection, controlling, and/or activation, for the boundary control device 12. The power storage member 42 of one or more embodiments includes one or more batteries, including NiMh batteries or lithium batteries, one or more capacitors, or one or more other energy storage devices known in the art.

The device 12 further includes a power generator 44 configured to convert, generate, or otherwise supply power to the boundary control device 12. The power generator 44 and/or the power storage member 42 includes a power controller 66 configured to control generation, storage, conversion, of electrical power as known in the art. In one non-limiting example, the power controller 66 monitors the voltage in the power storage member 42, converts power from the power generator 44 to proper voltage for storage and/or usage, and/or activates an active or sleep mode based on periods of no or low activity, power generation, and/or object sensing.

In the illustrated embodiments of FIGS. 3 and 4, the power generator 44 is a solar panel 46 positioned at or near the upper portion 48 of the device 12. The solar panel 46 includes a position control member 50 to position the solar panel 46. The position control member 50 of one embodiment includes a rotatable and tiltable joint for manual fixing and/or repositioning of the solar panel 46. In such an embodiment, the position control member 50 allows a user to rotate and/or tilt the solar panel 46 into a particular orientation to maximize the capture of solar energy. In one or more additional embodiments, the solar panel 46 includes electronic or mechanical positioning or adjusting members. In one non-limiting example, the solar panel 46 includes a sun tracking system, such as one or more systems known by those having ordinary skill in the art, configured to control the solar panel 46, either through sensing or memory and data-based algorithms, such that the solar panel 46 substantially faces the sun during various periods of the day, season, and/or year. In additional embodiments, the power generator 44 is a heat engine, such as a stirling engine, a thermoelectric generator, an internal or external combustion engine, or a wind, water, or wave turbine or generator to name several non-limiting examples.

Figure 5:
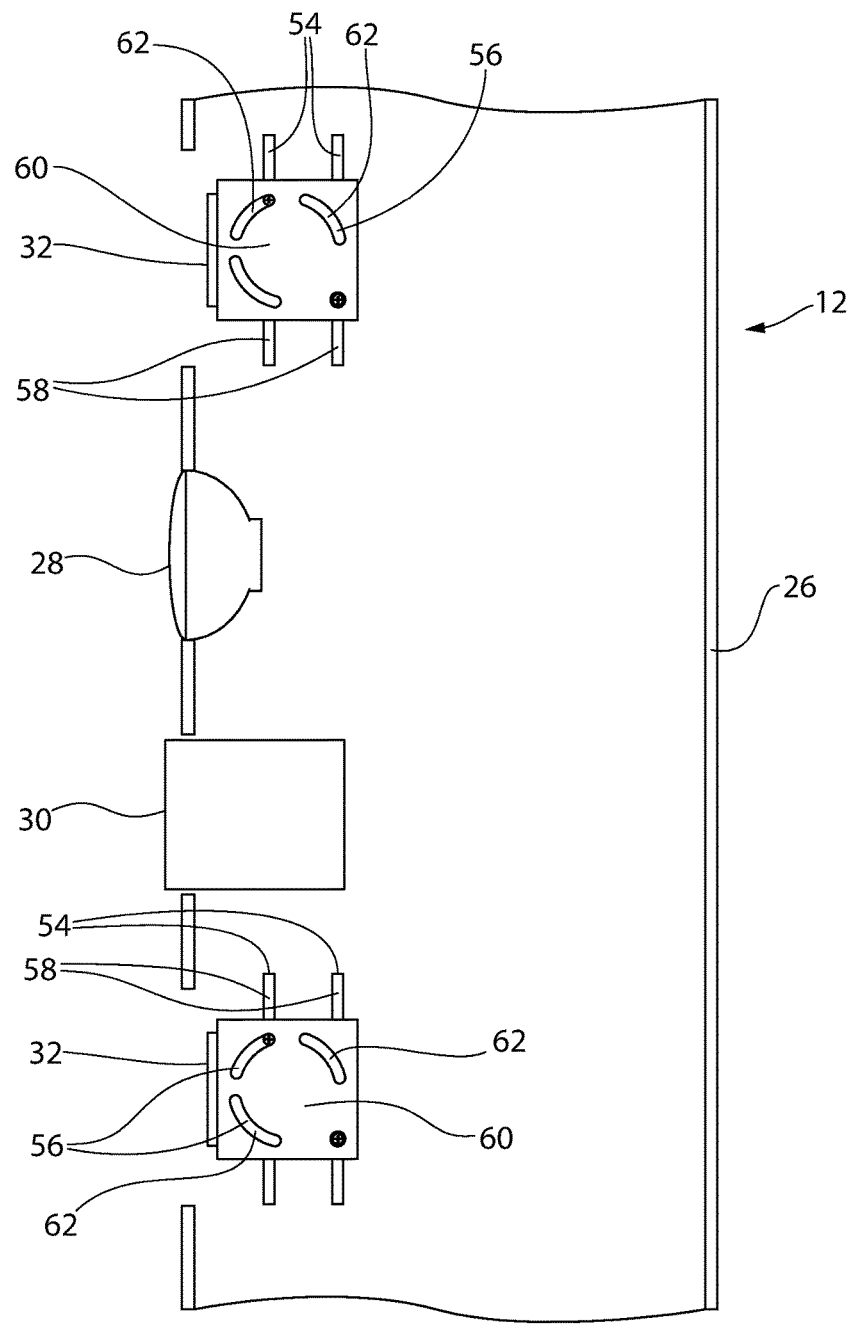
FIG. 5 is a side cross sectional view of boundary control device in accordance with one embodiment of the present disclosure.

Referring now to FIG. 5, in one or more embodiments of the present disclosure, the device 12 includes an angular orientation adjustment member 56 and/or a position adjustment member 54. The angular orientation adjustment member 56 includes a bracket 60 with one or more slots 62 extending along a curve to allow angular adjustment of the boundary sensor 32. Although not shown, the sound emitter 28 and/or the light emitter 30 may also be coupled to an angular orientation adjustment member to allow angular adjustment. In boundary control systems 10 having a boundary 14 that is not level or even or including obstructions or having one or more devices 12 or reflectors positioned at an elevation different than that of the boundary sensor 32, the angular orientation adjustment member 56 allows the device 12 to conform to varying terrains and obstacles.

In an embodiment, the position adjustment member 54 includes one or more slots or bars 58 extending vertically inside the base member 26 to allow vertical adjustment of the boundary sensor 32. Although not shown, the sound emitter 28 and/or the light emitter 30 may also be coupled to a position adjustment member to allow vertical adjustment. Further, although not shown, the position adjustment member 54 may include horizontally extending rails or bars to permit horizontal adjustment.

In additional embodiments not illustrated, the device 12 includes one or more rotational adjustment members allowing rotation of one or more components 18 relative to the base member 26.

In one non-limiting example, a method of conditioning the behavior of an animal, including wildlife such as a deer, is provided. The behavior of persons not desired to or authorized to approach or cross the boundary 14 is conditioned in accordance with an embodiment. During a first period of time, a first number of objects are sensed by the boundary sensor 32, and the sound emitter 28 and the light emitter 30 are activated. During a second period of time, a second number of objects are sensed by the boundary sensor 32, and the sound emitter 28 and the light emitter 30 are activated. During a third period of time, a third number of objects are sensed by the boundary sensor 32, and the sound emitter 28 and the light emitter 30 are activated. In an embodiment, the first period of time occurs before the second period of time, and the second period of time occurs before the third period of time. In an embodiment, the first number objects is greater than the second number of objects, and the second number of objects is greater than the third number of objects. As will be recognized, the system 10 and/or the device 12 alters, adjusts, conditions, or otherwise controls the presence of objects, including animals or persons, at, along, or adjacent to the boundary 14.

The embodiments of the present disclosure provide a system 10 and device 12 that emits light and sound to control, condition, deter, or otherwise alert objects, including animals and persons, on, along, or adjacent to the boundary 14 for boundary control that is markedly superior to the effects of an alert from either a sound alert or a light alert alone. Further, as described in one or more embodiments disclosed herein, the combined effect of activating a predatory animal sound and a strobing light on, along, or adjacent to the boundary 14 results in boundary control that is more effective than the sum of results from a device that activates a predatory animal sound and a device that activates a strobing light. The system 10 and device 12 of described embodiments further includes distributed, stand-alone, or otherwise independent power supply, generation, and/or storage to permit the deployment, operation, and/or installation at remote locations, along large boundaries of land or water, and/or independent of a centralized power system or grid. Further, the system 10 and device 12 is environmentally friendly and not obtrusive to landscapes or natural habitats. The system 10 and device 12 is inexpensive to deploy and activate, and maintenance requires very little cost or labor.

Having shown and described particular embodiments of the disclosure, those skilled in the art will realize that many variations and modifications may be made to affect the described disclosure and still be within the scope of the claimed disclosure. Thus, many of the elements indicated above may be altered or replaced by different elements which will provide the same result and fall within the spirit of the claimed disclosure. It is the intention, therefore, to limit the disclosure only as indicated by the scope of the claims.

What is claimed is:

1. A boundary control device comprising:
   a base member configured to be positioned adjacent a boundary;
   a sound emitter coupled to the base member, directed toward the boundary, and configured to emit a predatory animal sound upon activation along the boundary;
   a light emitter coupled to the base member, directed toward the boundary, and configured to emit a strobing light upon activation along the boundary; and
   a boundary sensor coupled to the base member and configured to sense an object disposed along the boundary, wherein the sound emitter and the light emitter are activated upon sensing of the object by the boundary sensor; and
   a rail member suspended from an upper portion of the base member and extending inside and along the base member,
   wherein the rail member is configured to be lifted out from the upper portion of the base member, and
   wherein the base member includes a hollow, vertically-extending post such that the sound emitter, the light emitter, and the boundary sensor are coupled to the post in a vertically extending array, and the rail member houses the sound emitter, the light emitter, and the boundary sensor to form the vertically extending array inside the base member.

2. The boundary control device of claim 1, further comprising at least one power storage member to store power for the boundary control device.

3. The boundary control device of claim 1, further comprising a power generator configured to supply power to the boundary control device.

4. The boundary control device of claim 1, wherein the boundary sensor includes a position adjustment member configured to vertically adjust the boundary sensor.

5. The boundary control device of claim 1, further comprising a controller in electrical communication with at least one of the sound emitter, the light emitter, and the boundary sensor, wherein the controller is coupled to the rail member.

6. The boundary control device of claim 5, wherein the controller includes an activation timer configured to control an activation duration.

7. A boundary control device comprising:
   a base member configured to be positioned adjacent a boundary;
   a sound emitter coupled to the base member, directed toward the boundary, and configured to emit a predatory animal sound upon activation along the boundary;
   a light emitter coupled to the base member, directed toward the boundary, and configured to emit a strobing light upon activation along the boundary; and
   a boundary sensor coupled to the base member and configured to sense an object disposed along the boundary, wherein the sound emitter and the light emitter are activated upon sensing of the object by the boundary sensor;
   wherein the boundary sensor includes a position adjustment member configured to vertically adjust the boundary sensor;
   a rail member suspended from an upper portion of the base member and extending inside and along the base member,
   wherein the rail member is configured to be lifted out from the upper portion of the base member, and
   wherein the base member includes a hollow, vertically-extending post such that the sound emitter, the light emitter, and the boundary sensor are coupled to the post in a vertically extending array, and the rail member houses the sound emitter, the light emitter, and the boundary sensor to form the vertically extending array inside the base member.

* * * * *